(12) United States Patent
Karp (10) Patent No.: US 8,117,457 B2
(45) Date of Patent: Feb. 14, 2012

(54) TRUSTED HARDCOPY DOCUMENT (75) Inventor: Alan H. Karp, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1210 days.

(21) Appl. No.: 11/777,683

(22) Filed: Jul. 13, 2007

(65) Prior Publication Data

US 2009/0019550 A1   Jan. 15, 2009

(51) Int. Cl.
*H04L 9/32* (2006.01)
(52) U.S. Cl. ............. 713/180; 713/176; 726/27; 380/51
(58) Field of Classification Search .................. None
See application file for complete search history.

(56) References Cited

U.S. PATENT DOCUMENTS

| 6,442,276 | B1 * | 8/2002 | Doljack | 380/51 |
| 7,051,206 | B1 * | 5/2006 | Giest et al. | 713/176 |
| 7,526,812 | B2 * | 4/2009 | DeYoung | 726/26 |

\* cited by examiner

*Primary Examiner* — Kaveh Abrishamkar (57) ABSTRACT

A trusted hardcopy document is generated using a two-part confirmation number including a private part and a public part. A public part of the confirmation number is received at a first party creating the trusted hardcopy document. The private part of the confirmation number is sent to an owner of the trusted hardcopy document by a trusted party and is not sent to the first party creating the trusted hardcopy document. A human-readable form and a machine readable form of the public part of the confirmation number are printed on the trusted hardcopy document.

23 Claims, 6 Drawing Sheets

TRUSTED HARDCOPY DOCUMENT

BACKGROUND

Many times printed documents are needed to prove ownership of some valuable resource. Real estate deeds and stock certificates are examples of these types of documents. Since these documents represent valuable resources and can be used as collateral for a loan, making forgery difficult and the ability to identify the rightful owner is important.

One threat to the use of these documents is that someone will produce a fake document that looks like the original. Another threat is that a legitimate creator of such documents creates unauthorized documents that don't represent real value. Yet another threat is that a legitimate document will be stolen or copied.

Rightful ownership is often proven with a "wet signature", which is an original signature written on a piece of paper, as opposed to a fax copy or to an agreement offered verbally or electronically. However, documents requiring a wet signature are vulnerable until the documents are signed. Also, a signature may be forged. Furthermore, illiterates and some handicapped people may not be able to write a signature.

SUMMARY

A trusted hardcopy document is generated using a two-part confirmation number including a private part and a public part. A public part of the confirmation number is received at a first party creating the trusted hardcopy document. The private part of the confirmation number is sent to an owner of the trusted hardcopy document by a trusted party and is not sent to the first party creating the trusted hardcopy document. A human-readable form and a machine readable form of the public part of the confirmation number are printed on the trusted hardcopy document.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF THE EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to an embodiment, a combination of secure printing and a two-part confirmation number is used to make forgery more difficult and to make proving ownership easier for a document. The two-part confirmation number includes a public part and a private part. The private part is securely stored and is distributed to the owner of the document. The private part or both the private part and the public part are used to verify ownership of the document. Also, a multi-party system is used to generate the document and verify ownership of the document. Use of the multi-party system helps prevent forgery and minimizes the impact of document theft. Also, secure printing, including printing machine readable information and encoded signatures on the document aid in verifying authenticity of the document and preventing forgery.

Figure 1:
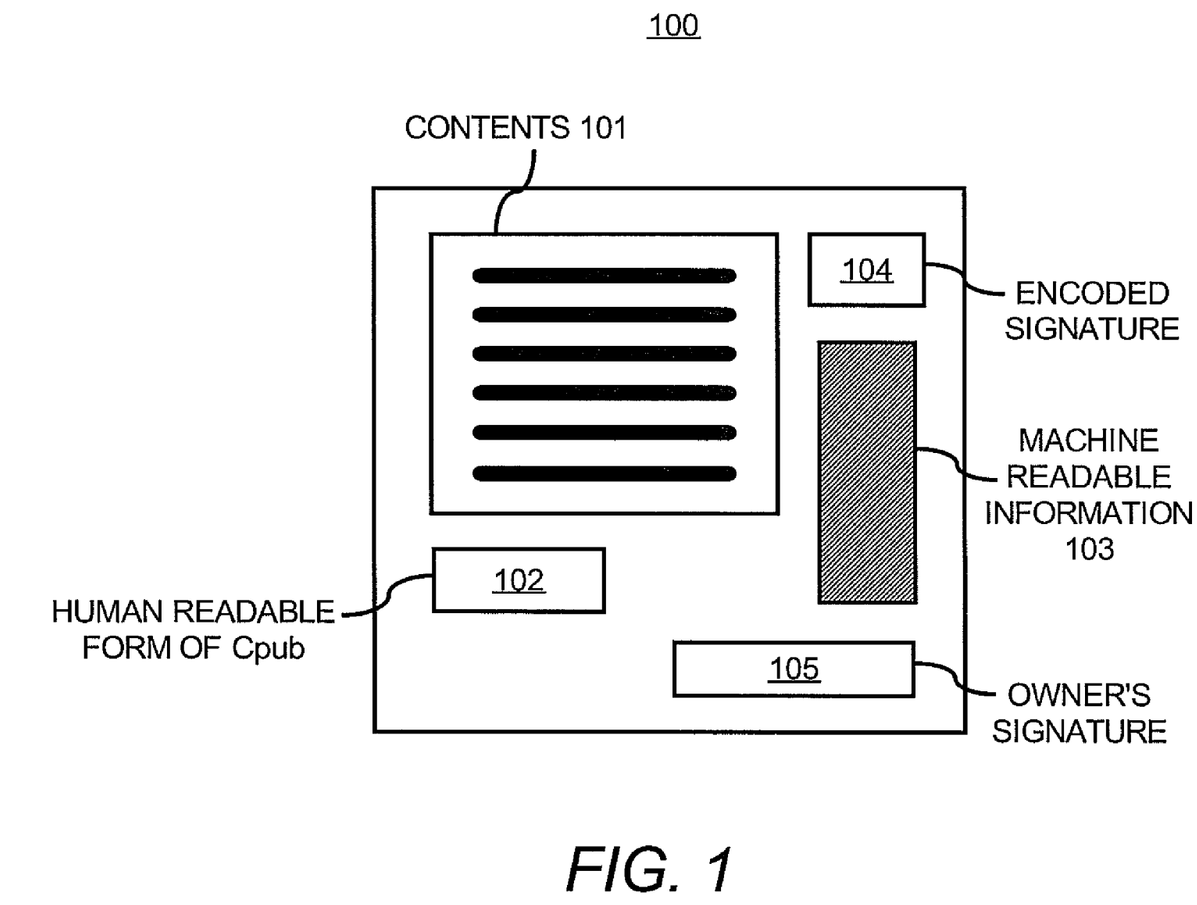
FIG. 1 illustrates an example of a trusted hardcopy document, according to an embodiment.

FIG. 1 illustrates a trusted hardcopy document 100, according to an embodiment. A hardcopy document is a hardcopy version of a document that is printed or otherwise produced. The document is trusted because it includes or is associated with several items of information for verifying its authenticity and ownership of the document, including a two-part confirmation number.

The trusted hardcopy document 100 includes its contents 101. The contents 101 are information, such as text, images, etc. The trusted hardcopy document 100 has a corresponding two-part confirmation number, including a public part, Cpub, and a private part, Cpriv. A human readable form 102 of Cpub is printed on the trusted hardcopy document 100. A machine readable form 103 of Cpub is also printed on the trusted hardcopy document 100. The machine readable form 103 may include additional information pertaining to the attributes of the document, such as date of creation, document type, etc., and/or some of the contents 101 of the document in machine readable form. One example of a machine readable form is a bar code, but other types of encoding may be used to represent the information in machine readable form. In addition, a signature 104 of the producer of the document is printed on the trusted hardcopy document 100. The signature 104 includes at least some information, referred to as security information, only available to the producer of the document. The signature 104 is encoded and printed on the document, so the signature 104 is not easily copied to represent the same information.

Thus, the trusted hardcopy 100 includes two signatures from parties other than the owner. One signature is the machine readable information 103. This signature is a signature of the party that provides the confirmation number, such as a stock exchange described below. The machine readable information 103 and the human readable form of Cpub is sent to another party, such as a broker described below, and printed on the trusted hardcopy document 104. This party printing the trusted hardcopy document 104 also has a signature, shown as the encoded signature 104. The encoded signature 104 is a digital signature that is encoded and printed on the trusted hardcopy document 104. The encoded signature 104, for example, is the human readable information on the trusted hard copy document, such as the contents 101 and Cpub, the machine readable information 103, and the party's own signature (e.g., security information only available to the party) that is in digital form. This digital information is encoded and printed on the trusted hardcopy document as the encoded signature 104. For example, the encoding of the digital information may be a printed logo.

The trusted hardcopy document may be signed by the owner. The owner's signature is shown as 105. In some instances, the owner's signature must be a wet signature for the document to be considered authentic.

Figure 2:
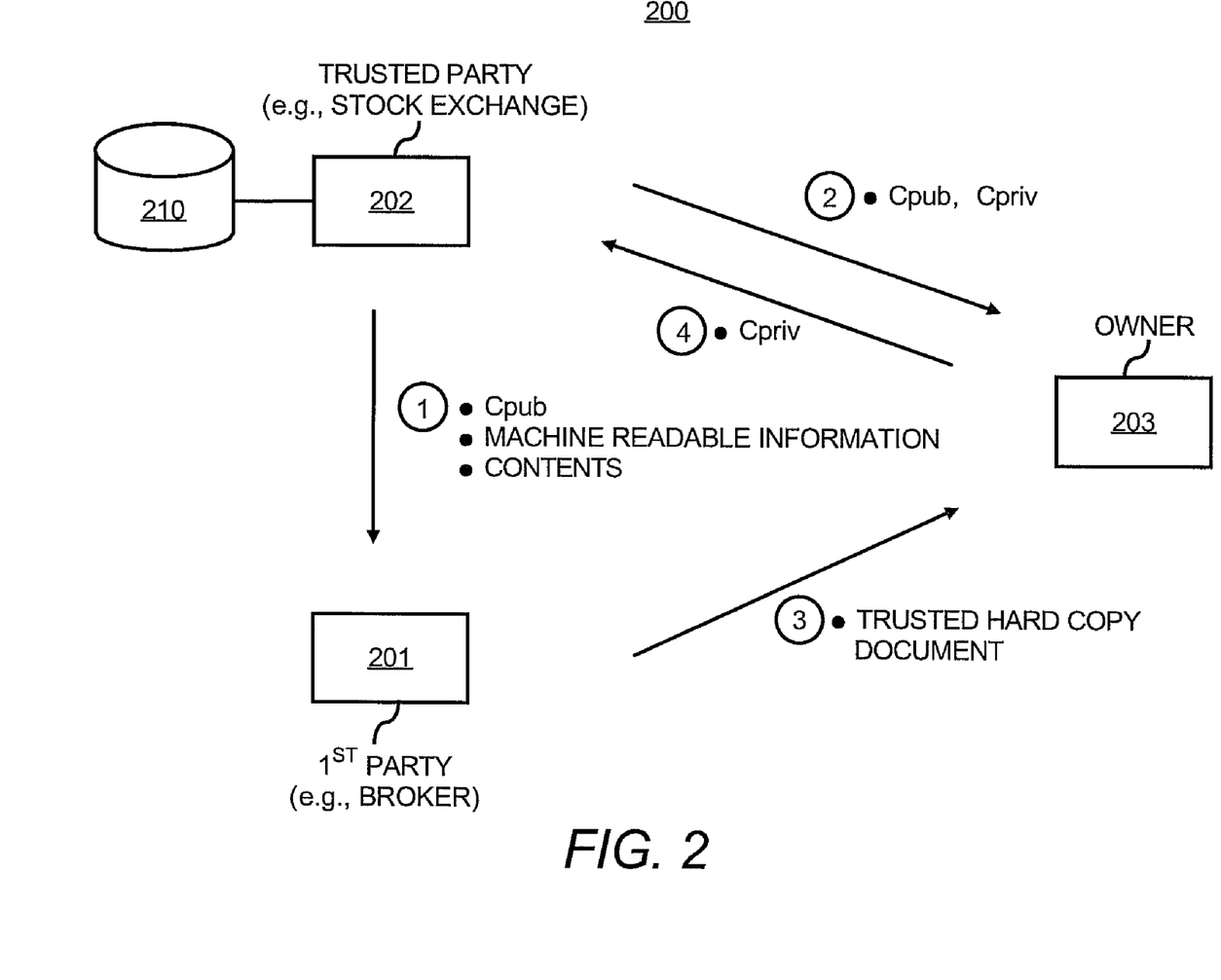
FIG. 2 illustrates a multi-party information flow diagram for creating a trusted hardcopy document, according to an embodiment.

FIG. 2 illustrates a multi-party information flow diagram 200 for creating the trusted hardcopy document 100, according to an embodiment. The diagram 200 is described by way of example as the trusted hardcopy document being a stock certificate representing one or more shares of ownership in a corporation. Other types of documents may be created using the steps described herein. For example, deeds, bearer bonds, commercial paper, negotiable instruments, etc. may be created and authenticated and ownership may be verified using the steps described herein.

FIG. 2 shows three parties exchanging information, including a trusted party 202, also referred to as a second party, a first party 201 and an owner 203. The first party 201, for example, is a broker printing a stock certificate, which is the trusted hardcopy document in this example, for the owner 203. The owner 203 is the owner of the trusted hardcopy document, i.e., the stock certificate. The owner 203 may also be the owner of the stock represented by the stock certificate.

The owner 203 purchases stock via the broker 201 and a stock exchange, which in this example is the trusted party 202. The stock exchange 202 may typically issue a stock certificate to the owner 203 and send the certificate to the owner 203, for example, via a courier or mail. However, if the stock certificate is stolen in transit to the owner 203, the thief may forge the owner's signature and sell the stock certificate. In other instances, someone at the stock exchange 202 may print illegitimate stock certificates and sell them. This is especially the case in countries that do not have sophisticated stock exchanges or sophisticated security measures in place to prevent this type of fraud and theft.

According to an embodiment, the stock exchange 202 creates a two-part confirmation number for each stock certificate to be created. The two-part confirmation number includes a public part Cpub and a private part Cpriv. A corresponding Cpub and Cpriv for each stock certificate may be stored in secure storage 210 to prevent unauthorized access to the confirmation numbers.

Cpub is sent to the broker 201, shown as 1. Cpub and Cpriv are sent to the owner 203, shown as 2. Although, sending Cpub to the broker 201 is shown as 1 and sending Cpub and Cpriv to the owner 203 is shown as 2, these steps may be performed at the same time or in a different order. Also, different types of channels may be used to send information. For example, Cpub and Cpriv may be communicated to the owner 203 via telephone or non-electronic mail. Cpub may be communicated to the broker 201 electronically via a network.

Also, shown is that a machine readable form is transmitted from the stock exchange 202 to the broker 201. The machine readable form is an encoding of Cpub, such as a bar code. The information encoded in the machine readable form may also include information in the contents of the stock certificate, such as the name of the company, types of chares, number of shares, etc.

Along with Cpub and the machine readable information, the contents of the stock certificate may be sent to the broker 201. This may include an electronic file. In one embodiment, an electronic file is sent from the stock exchange 202 to the broker 201 including the contents of the stock certificate, Cpub in human readable form and Cpub in machine readable form. In another embodiment, the stock exchange 202 only sends Cpub and the machine readable information. The broker 201 stores the information for the contents of the stock certificate.

The broker 201 creates a file including the information received from the stock exchange 202. For example, the broker 201 creates a file including the contents of the stock certificate, Cpub in human readable form and machine readable information including Cpub. Cpub in human readable form and information in machine readable form are shown as 103 and 104 in FIG. 1.

The broker 201 also creates an encoded signature and includes the encoded signature in the file. The encoded signature is the broker's signature. The encoded signature includes at least some information only known to the broker 201, which is referred to as security information. An encoded signature is shown as 104 in FIG. 1. The encoded signature of the broker prevents an employee at the stock exchange 202 from printing illegitimate stock certificates, because the employee at the stock exchange 202 should not be able to access the security information of the broker 201 and generate the encoded broker's signature.

The broker 201 prints the stock certificate. The printed stock certificate is the trusted hardcopy document. The printed stock certificate includes the contents of the stock certificate, Cpub in human readable form, machine readable information including Cpub, and the encoded signature of the broker 201. The printed stock certificate is then sent to the owner 203, shown as 3 in FIG. 2. The stock certificate may be hand-delivered, sent by mail, etc.

After the owner 203 receives the stock certificate, the owner 203 compares the Cpub printed on the certificate in human readable form with Cpub received from the stock exchange 202 to verify the authenticity of the stock certificate. The stock certificate may not be accepted if Cpub on the stock certificate does not match Cpub previously sent to the owner 203. If the two Cpubs match, the owner 203 signs the stock certificate. The owner's signature is shown as 105 in FIG. 1.

In one embodiment, after receiving the stock certificate from the broker 201, the owner 203 sends Cpriv to the stock exchange 202 to verify receipt of the stock certificate, which is shown as 4 in FIG. 2. Then, the stock exchange 202 sends the owner 203 a new Cpriv and deletes the old Cpriv previously sent to the owner 203, or the stock exchange deletes Cpriv and the wet signature of the owner 203 on the stock certificate may be used to verify ownership.

Figure 3:
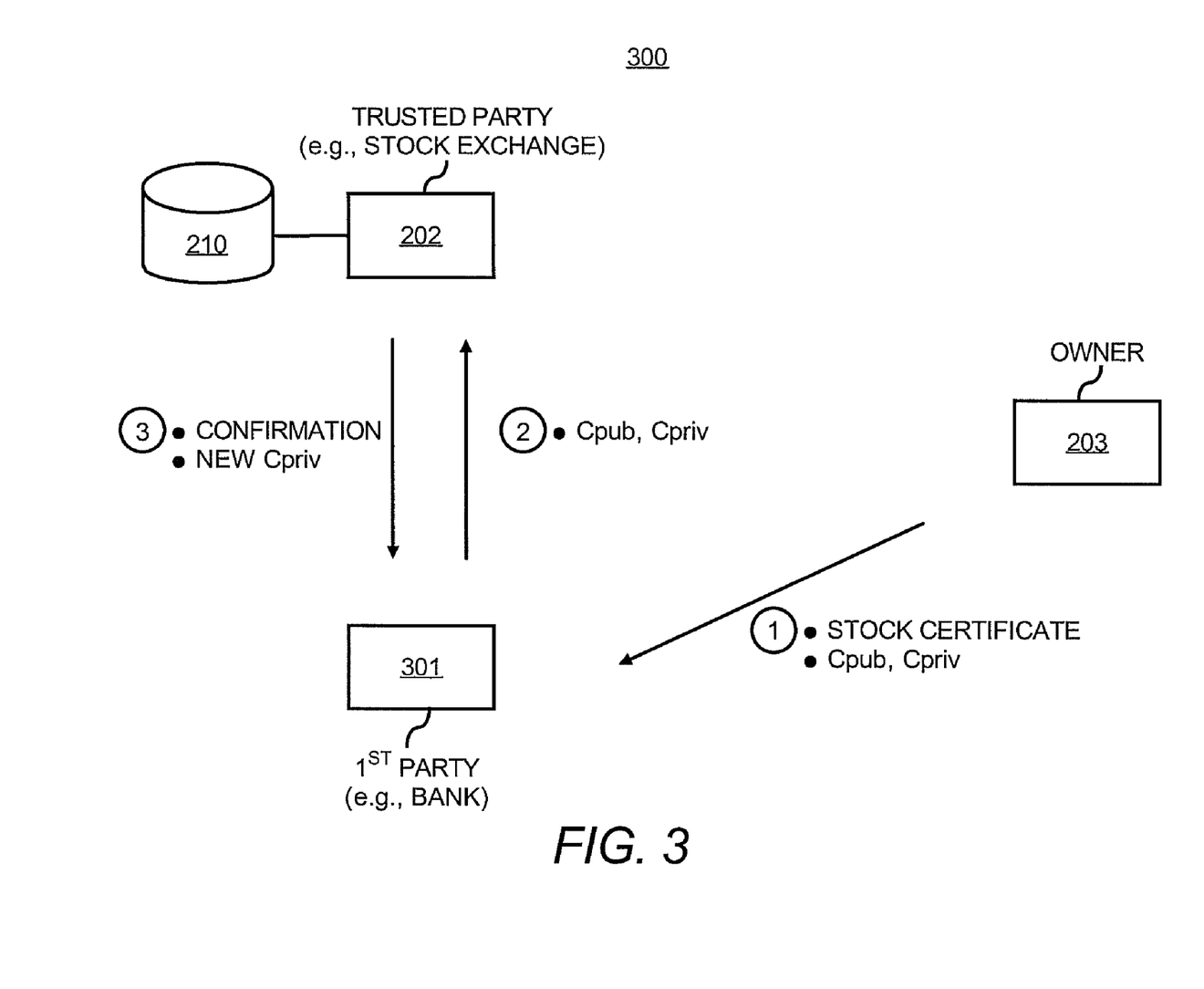
FIG. 3 illustrates a multiparty flow diagram for verifying legitimate ownership of a trusted hardcopy document, according to an embodiment.

FIG. 3 illustrates a multiparty flow diagram 300 for verifying legitimate ownership of a trusted hardcopy document, according to an embodiment. Verifying ownership of a trusted hardcopy document is again described with respect to a stock certificate being the trusted hardcopy document, but it will be apparent to one of ordinary skill in the art that ownership of any type of trusted hardcopy document may be verified in this manner. Also, the diagram 300 is described with respect to an example where the owner 203 is presenting the stock certificate to a bank for collateral for a loan. Entities other than a bank may verify ownership of a trusted hardcopy document.

The owner 203 sends the stock certificate, which is the trusted hardcopy document in this example, to the bank 301, also referred to the first party in FIG. 3. The bank 301 verifies the human readable form of Cpub on the stock certificate matches the machine readable form of Cpub also on the stock certificate. Also, the bank 301 verifies the human readable information on the stock certificate, such as the contents, corresponds with the machine readable information. The bank 301 may have a reader capable of reading the machine readable information on the stock certificate and displaying the information in human readable form, such as ASCII plain text, to a user. Also, the bank 301 verifies the wet signature on the stock certificate to be the signature of the owner 203.

The owner 203 also sends Cpub and Cpriv to the bank 203. If the bank 301 determines the Cpub in human readable form matches the Cpub in machine readable form, the bank 301 sends Cpub and Cpriv to the stock exchange 202, which is shown as 2 in FIG. 3.

The stock exchange 202 determines whether the Cpub and Cpriv sent from the bank 301 matches a stored Cpub and Cpriv corresponding to the stock certificate, which may be retrieved from the secure storage 210. If they match, then the stock exchange 202 sends a confirmation to the bank 301 indicating the Cpubs and Cprivs match. This verifies the owner 203 is a legitimate owner of the stock certificate. The stock exchange 202 also generates and stores a new Cpriv for the stock certificate and sends the new Cpriv to bank 301. The bank 301 may have a security interest in the stock represented by the stock certificate if the stock is used as collateral for a loan.

In other embodiments, the bank 301 relies solely on the anti-counterfeiting features of the trusted hardcopy document, such as the Cpub printed in human readable form, the machine readable information and possibly the encoded broker's signature if the bank 301 can decode the broker's signature. The bank 301 may also verify ownership using the wet signature. Also, ownership of a trusted hardcopy document can be proven in the absence of the document, e.g., if it is destroyed or for distance interactions, by verifying Cpub and Cpriv with the trusted party 202. In a low-tech environment, ownership can be verified by sending Cpub and Cpriv to the trusted party 202 via a telephone call and having the new Cpriv returned as part of that same call.

There are many advantages to the multiparty systems described above. At least two parties must cooperate to produce a fraudulent certificate that will be validated by the stock exchange. The employee of the stock exchange 202 cannot produce illegitimate stock certificates without the broker's security information. The broker 201 cannot produce the security bar code (i.e., the machine readable information), which may depend on the stock exchange's security information. The creator of a fake certificate cannot guess Cpub, making it harder to trick the buyer of the stock into accepting a fake stock certificate. Also, the owner 203 cannot use copies of the stock certificate as collateral for multiple loans because the bank 301 gets the new Cpriv when the stock certificate is validated. There is less risk to the owner 203 of a lost or destroyed stock certificate, since the owner 203 can prove rightful ownership via knowledge of Cpriv. The printed stock certificate may not have any value without knowledge of Cpriv, even when the stock certificate has not yet been signed. People without a signature, such as the handicapped and illiterates, can prove rightful ownership. The ability to prove rightful ownership can be delegated, such as to a spouse or an heir. Also, the buyer's/owner's privacy is preserved if the stock exchange only records Cpub and Cpriv but not the contents of the certificate. In this embodiment, the stock exchange does not have the contents of the stock certificate. Instead, this information is retained at the broker 201, which prints the stock certificate.

Figure 4:
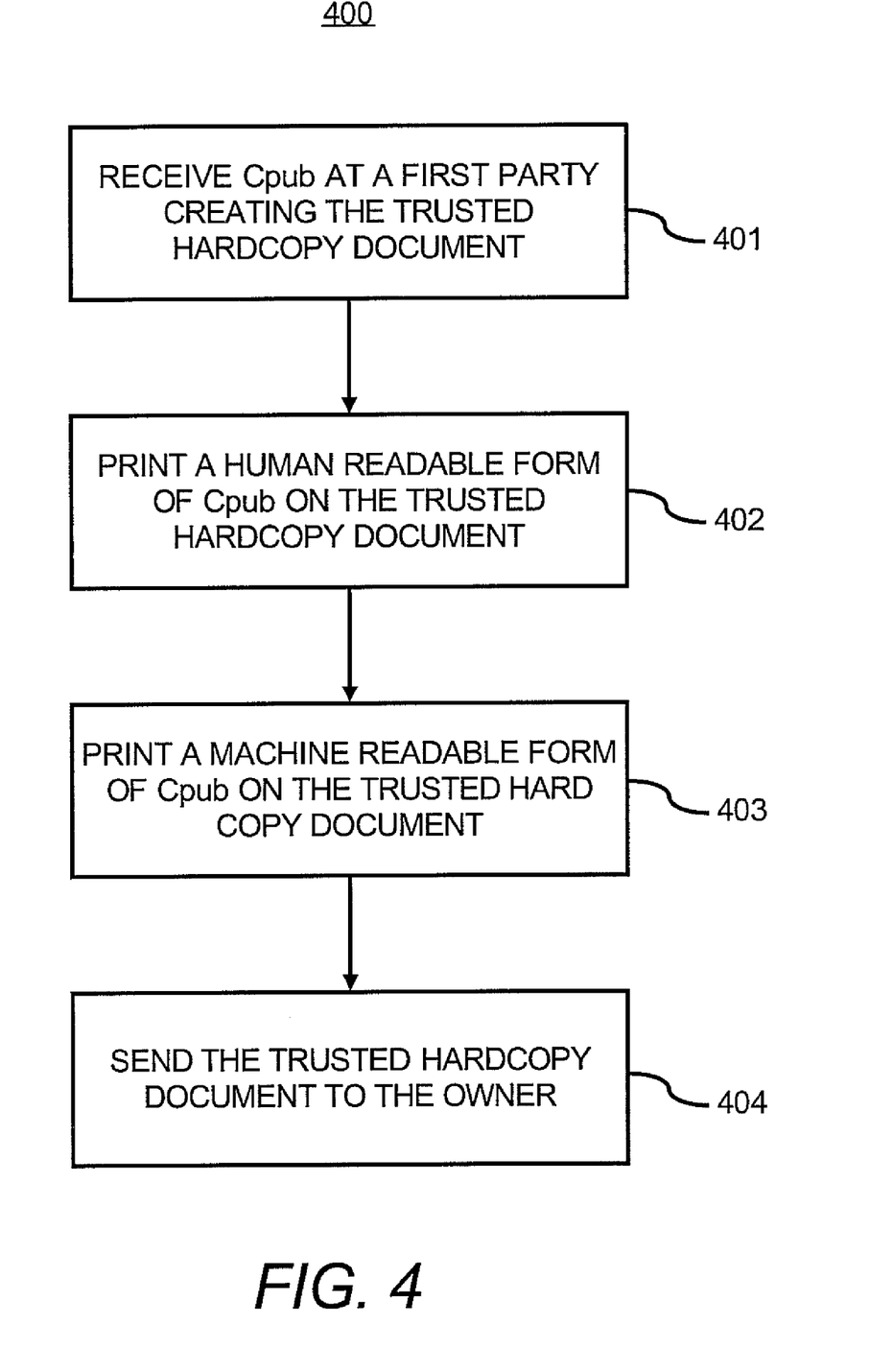
FIG. 4 illustrates a flow chart of a method for creating a trusted hardcopy document, according to an embodiment.

FIG. 4 illustrates a flow chart of a method 400 for creating a trusted hardcopy document, according to an embodiment. FIG. 4 may be described with respect to FIGS. 1-3 by way of example and not limitation.

At step 401, a public part of a confirmation number, Cpub, is received at a first party creating the trusted hardcopy document. For example, the broker 201 receives Cpub from the stock exchange 202, as shown in FIG. 2. The private part of the confirmation number, Cpriv, is sent to the owner 203 of the trusted hardcopy document by the trusted party 202 and is not sent to the first party 201 creating the trusted hardcopy document. For example, Cpriv is sent to the owner 203 from the stock exchange 203, but Cpriv is not sent to the broker 201.

At step 402, a human-readable form of Cpub is printed on the trusted hardcopy document. For example, Cpub is printed on the stock certificate.

At step 403, a machine-readable form of Cpub is printed on the trusted hard copy document. For example, information in machine readable form, including Cpub in machine readable form, is printed on the stock certificate. The machine readable information is encoded, such as bar coding.

At step 404, the trusted hardcopy document is sent to the owner 203, wherein the trusted hardcopy document includes Cpub in human readable form and machine readable form. Also, an encoded signature of the first party 201, such as the broker's encoded signature, may also be printed on the trusted hardcopy document.

Figure 5:
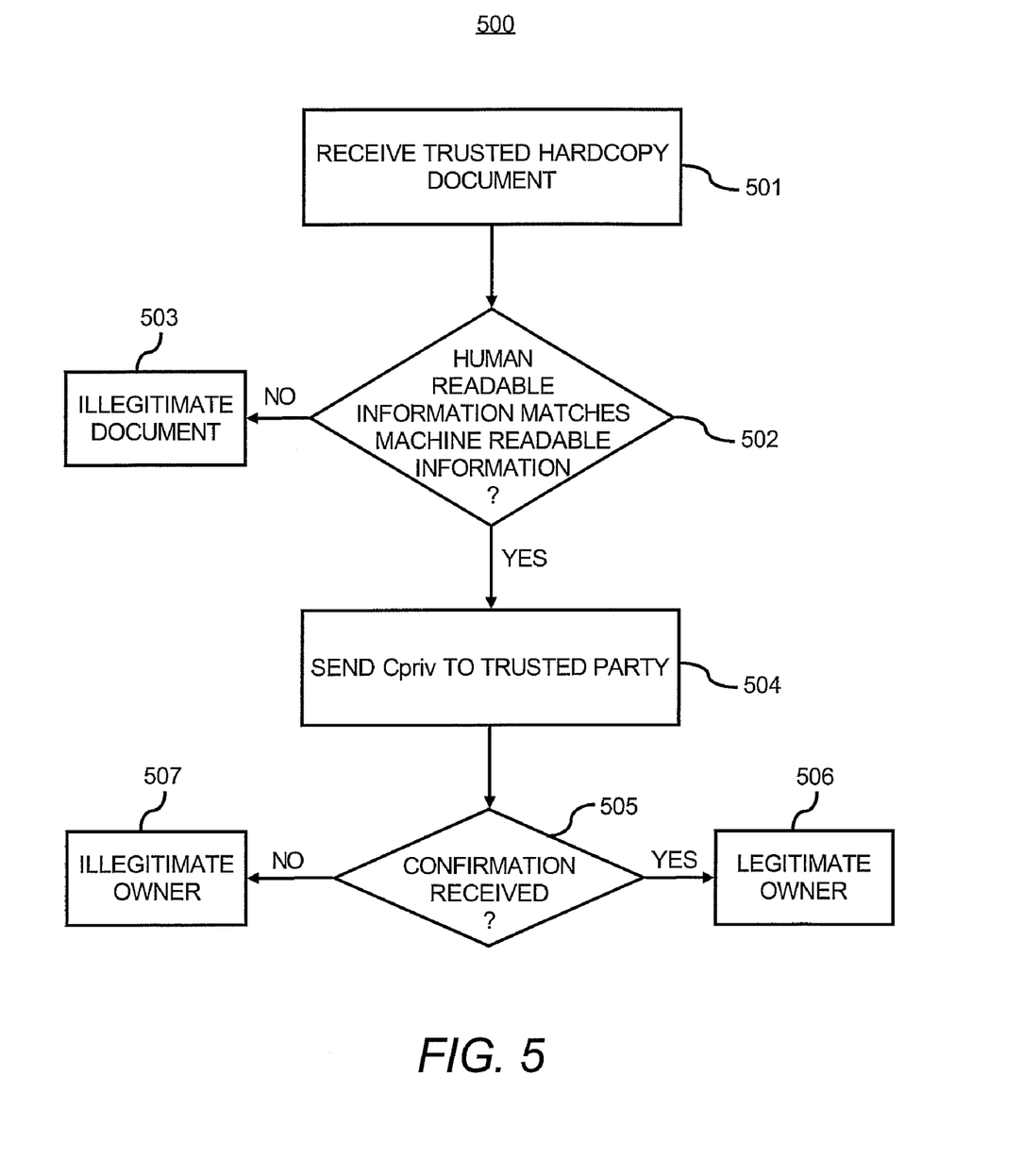
FIG. 5 illustrates a flow chart of a method for verifying legitimate ownership of a trusted hardcopy document, according to an embodiment.

FIG. 5 illustrates a flow chart of a method 500 for authenticating a trusted hardcopy document using a two-part confirmation number including a private part, Cpriv, and a public part, Cpub, according to an embodiment. FIG. 5 may be described with respect to FIGS. 1-3 by way of example and not limitation.

At step 501, the trusted hardcopy document is received from the owner 203 of the trusted hardcopy document. The trusted hardcopy document includes a human readable form of Cpub and a machine readable form of Cpub. For example, the bank 301, shown in FIG. 3, receives the stock certificate from the owner 203.

At step 502, the human readable form of Cpub is compared to machine readable form of Cpub. Also, the machine readable information 103 may includes other human readable information on the trusted hardcopy document 104, such as information from the contents 101, which is encoded in machine readable form. This information in machine readable form is also compared to the information in human readable form on the trusted hardcopy document 104. At step 504, if the human readable information, such as Cpub and other information matches the information in machine readable form, Cpriv is sent to the trusted party 202. For example, as shown in FIG. 3, Cpriv is sent from the bank 301 to the stock exchange 202. Cpub may also be sent to the stock exchange 202. At step 503, if the human readable information does not match the machine readable information, a determination is made that the trusted hardcopy document 104 is illegitimate.

At step 505, a determination is made as to whether a confirmation is received from the trusted party 202. At step 506, the owner 203 is determined to be a legitimate owner of the trusted hardcopy document if the confirmation is received from the trusted party 202 indicating that Cpriv sent to the trusted party matches Cpriv originally sent to the owner 203. For example, the owner 203 is determined to be the legitimate owner of the stock certificate if Cpriv sent to the stock exchange 202 from the bank 301 matches the Cpriv stored in the secure storage 210 corresponding to the stock certificate, which was previously sent to the owner 203 as shown in FIG. 2. If the confirmation is not received, the owner is determined to be an illegitimate owner at step 507. The wet signature of the owner 203 on the trusted hardcopy document 104 may also be used to verify the owner is the legitimate owner.

Figure 6:
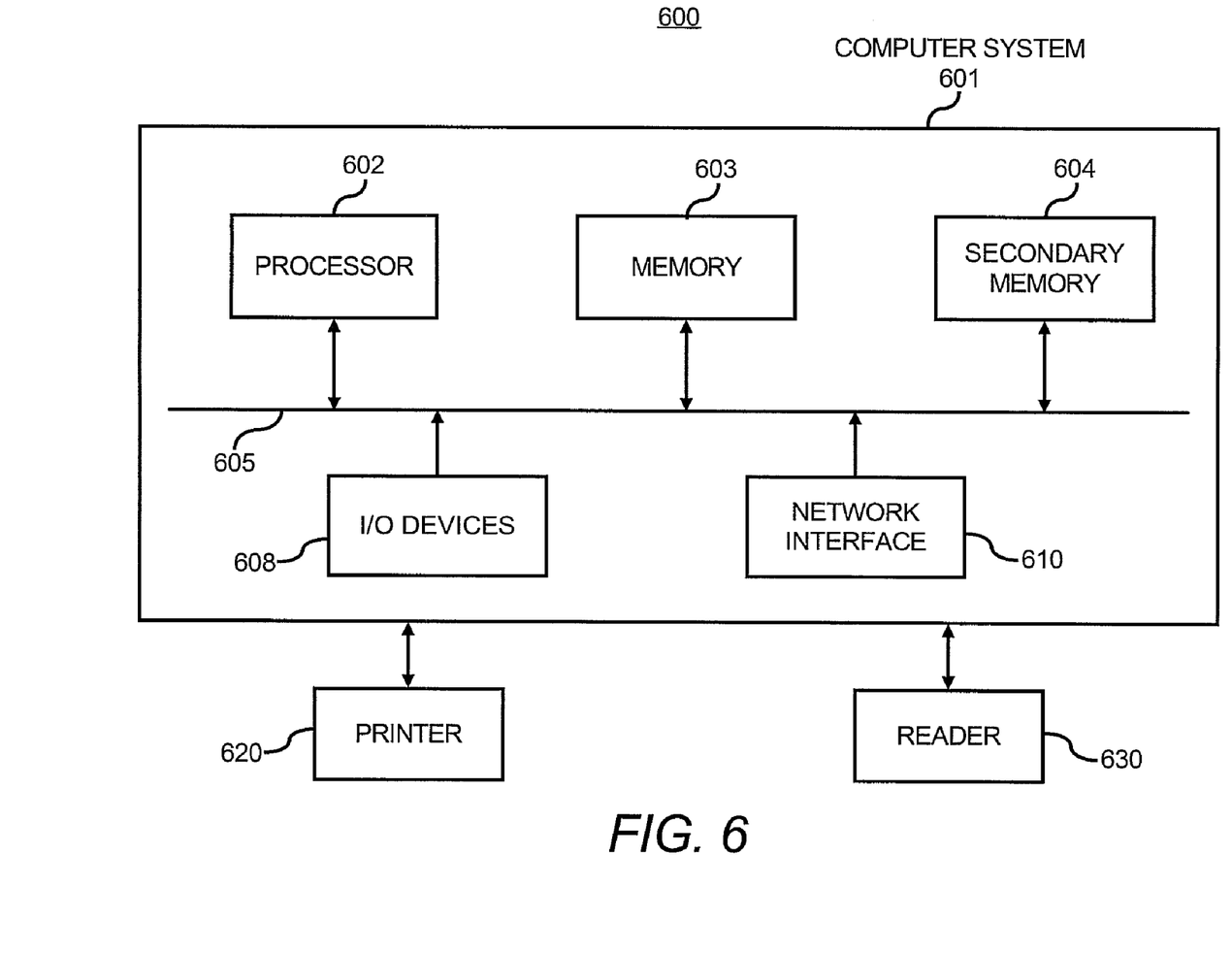
FIG. 6 illustrates a system, according to an embodiment.

FIG. 6 illustrates an exemplary block diagram of a system 600 including a computer system 601, a printer 620 and a reader 630. The computer system 600 includes one or more processors, such as processor 602, providing an execution platform for executing software.

Commands and data from the processor 602 are communicated over a communication bus 605. The computer system 600 also includes a main memory 603, such as a Random Access Memory (RAM), where software may be resident during runtime, and a secondary memory 604. The secondary memory 604 includes, for example, a hard disk drive and/or a removable storage drive, representing a floppy diskette drive, a magnetic tape drive, a compact disk drive, etc., or a non-volatile memory where a copy of the software may be stored. The secondary memory 604 may also include ROM (read only memory), EPROM (erasable, programmable ROM), EEPROM (electrically erasable, programmable ROM). In addition to storing software, the storage 603 and 604 may be used to store any information for generating a trusted hardcopy document as described in the embodiments above.

A user interfaces with the computer system 600 with one or more I/O devices 608, such as a keyboard, a mouse, a stylus, display, and the like. A network interface 610 is provided for communicating with other computer systems via a network. For example, the network interface operates as a transmitter and a receiver. The interface 610 may be used to send or receive information for creating a trusted hardcopy document or for verifying ownership or authenticity. A trusted hardcopy document may be sent via the interface 610 to another party.

One or more of the steps of the methods 400 and 500 and other steps described herein may be implemented as software embedded on a computer readable medium, such as the memory 603 and/or 604, and executed on the computer system 601, for example, by the processor 602. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

The system 600 also includes the printer 620 which is configured to print a trusted hardcopy document. For example, the computer system 601 sends the printer a file including the trusted hardcopy document and the document is printed.

The system 600 also includes the reader 630. The reader 630 is operable to read the machine readable information on a trusted hardcopy document and present the information in human readable form to a user, such as via a display. One example of a reader is a bar code reader.

It will be apparent to one of ordinary skill in the art that the system 600 is meant to illustrate a generic system, and many conventional components may be used in the system 600 that are not shown.

While the embodiments have been described with reference to examples, those skilled in the art will be able to make various modifications to the described embodiments without departing from the scope of the claimed embodiments.

What is claimed is:

1. A method of generating a trusted hardcopy document using a two-part confirmation number including a private part and a public part, the method comprising:
  receiving, from a trusted party, a public part of the confirmation number at a first party creating the trusted hardcopy document, wherein the private part of the confirmation number is sent to an owner of the trusted hardcopy document by the trusted party and is not sent to the first party creating the trusted hardcopy document;
  printing a human-readable form of the public part of the confirmation number on the trusted hardcopy document; and
  printing a machine-readable form of the public part of the confirmation number on the trusted hard copy document.

2. The method of claim 1 further comprising:
  printing an encoded signature of the first party on the trusted hard copy document.

3. The method of claim 2, wherein at least a portion of the encoded signature comprises security information only available to the first party.

4. The method of claim 2, wherein the human-readable form of the public part of the confirmation number, the machine-readable form of the public part of the confirmation number and the encoded signature of the first party are all printed by the first party on the trusted hardcopy document.

5. The method of claim 1, further comprising:
  sending the trusted hardcopy document from the first party to the owner via a first type of channel, wherein the private part of the confirmation number is sent from the trusted party to the owner via a second type of channel different from the first type.

6. The method of claim 1, further comprising:
  receiving the machine-readable form of the public part of the confirmation number transmitted from the trusted party at the first party.

7. The method of claim 1, wherein the private part of the confirmation number is securely stored to prevent unauthorized access to the private part of the confirmation number.

8. The method of claim 1, wherein the public part of the confirmation number is computed as a one-way function of the private part of the confirmation number.

9. The method of claim 1, wherein the first party is a broker and the trusted hardcopy document is a stock certificate.

10. The method of claim 9, wherein the trusted party is a stock exchange.

11. A method of verifying ownership of a trusted hardcopy document using a two-part confirmation number including a private part and a public part, the method comprising:
  receiving, at a first party, the trusted hardcopy document from an owner of the trusted hardcopy document, wherein the trusted hardcopy document includes human readable information including the public part of the confirmation number and machine readable information including a machine readable form of the public part of the confirmation number;
  comparing, by the first party, at least some of the human readable information, including the public part of the confirmation number, to the machine readable information;
  if the at least some of the human readable form matches the machine readable information, sending at least the private part of the confirmation number from the first party to a trusted party, wherein the trusted party originally provides the private part of the confirmation number to the owner and not to the first party; and determining the owner is a legitimate owner of the trusted hardcopy document if a confirmation is received from the trusted party indicating that the private part sent to the trusted party matches the private part originally sent to the owner.

12. The method of claim 11, wherein the at least some of the human readable information includes contents of the trusted hardcopy document.

13. The method of claim 11, wherein sending at least the private part of the confirmation number to a trusted party comprises:

sending the public part and the private part of the confirmation number to the trusted party.

14. The method of claim 13, wherein determining the owner is a legitimate owner of the trusted hardcopy document comprises:

determining the owner is a legitimate owner of the trusted hardcopy document if a confirmation is received from the trusted party indicating that the public part and the private part sent to the trusted party matches the public part and the private part originally sent to the owner.

15. The method of claim 11, wherein the trusted party deletes the private part of the confirmation number and assigns a new private part of the confirmation number to the trusted hardcopy document, and the confirmation received from the trusted party includes the new private part of the confirmation number.

16. The method of claim 11, wherein a wet signature on the trusted hardcopy document is verified to determine whether the owner is a legitimate owner of the trusted hardcopy document.

17. The method of claim 11, further comprising:

if the trusted hardcopy document is unavailable, proving the owner is a legitimate owner of the document by sending the public part and the private part of the confirmation number to the trusted party; and determining the owner is a legitimate owner of the trusted hardcopy document if a confirmation is received from the trusted party indicating that the public part and the private part sent to the trusted party matches the public part and the private part originally sent to the owner.

18. The method of claim 11, wherein sending at least the private part of the confirmation number to a trusted party originally providing the private part of the confirmation number to the owner comprises:

sending at least the private part of the confirmation number to the trusted party via telephone or non-electronic mail.

19. The method of claim 11, wherein the trusted hardcopy document is a stock certificate.

20. The method of claim 11, wherein the trusted party is a stock exchange.

21. A system operable to generate a trusted hardcopy document using a two-part confirmation number including a private part and a public part, the system comprising:

an interface receiving, from a trusted party, a public part of the confirmation number at a first party creating the trusted hardcopy document, wherein the private part of the confirmation number is sent to an owner of the trusted hardcopy document by the trusted party and is not sent to the first party creating the trusted hardcopy document;

a computer creating an electronic file including the contents of the trusted hardcopy document, and human readable information and machine-readable form, both of which include at least the public part of the confirmation number; and a printer connected to the computer and printing the trusted hardcopy document including the human readable and the machine-readable information.

22. The system of claim 21, wherein the computer generates an encoded signature of the first party including security information only available to the first party and the printer prints the encoded signature on the trusted hardcopy document.

23. The system of claim 21, further comprising:

a reader reading the machine readable information and converting the machine readable information to a human readable form for comparing the human readable information to the machine readable information;

if the human readable information and the machine readable information matches, the computer sends at least the private part of the confirmation number received from the owner to the trusted party originally providing the private part of the confirmation number to the owner; and the computer receives a confirmation from the trusted party indicating the owner is a legitimate owner of the document if the private part sent to the trusted party matches the private part originally sent to the owner.

\* \* \* \* \*